US008843846B2

(12) United States Patent
Cantor et al.

(10) Patent No.: US 8,843,846 B2
(45) Date of Patent: Sep. 23, 2014

(54) SYSTEM, METHOD AND GRAPHICAL USER INTERFACE FOR A SIMULATION BASED CALCULATOR

(75) Inventors: Murray R. Cantor, Cambridge, MA (US); Jacquelyn A. Martino, Hawthorne, NY (US); Paul M. Matchen, Hawthorne, NY (US)

(73) Assignee: International Business Machines Corporation, Armonk, NY (US)

( * ) Notice: Subject to any disclaimer, the term of this patent is extended or adjusted under 35 U.S.C. 154(b) by 1126 days.

(21) Appl. No.: 12/426,607

(22) Filed: Apr. 20, 2009

(65) Prior Publication Data
US 2010/0269061 A1 Oct. 21, 2010

(51) Int. Cl.
G06F 3/048 (2013.01)
G06F 17/24 (2006.01)

(52) U.S. Cl.
CPC .................................. G06F 17/246 (2013.01)
USPC .................. 715/780; 703/2; 703/13; 703/22; 702/34; 702/184

(58) Field of Classification Search
USPC .............. 715/780; 703/2, 22, 13; 702/34, 184
See application file for complete search history.

(56) References Cited

U.S. PATENT DOCUMENTS

| 7,752,020 B2* | 7/2010 | Seppanen et al. .................. 703/6 |
| 7,945,427 B2* | 5/2011 | Guenther et al. ............. 702/184 |
| 2002/0133329 A1* | 9/2002 | Kano et al. ....................... 703/22 |
| 2002/0169658 A1* | 11/2002 | Adler ............................... 705/10 |
| 2004/0111306 A1* | 6/2004 | Yokota et al. ...................... 705/7 |
| 2007/0244777 A1* | 10/2007 | Torre et al. ....................... 705/35 |
| 2008/0126024 A1* | 5/2008 | Gottsman .......................... 703/2 |
| 2008/0126054 A1* | 5/2008 | Cohen ............................. 703/13 |
| 2008/0126394 A1* | 5/2008 | Jain et al. ....................... 707/102 |
| 2009/0215011 A1* | 8/2009 | Christensen et al. ........... 434/29 |
| 2009/0265118 A1* | 10/2009 | Guenther et al. ............... 702/34 |
| 2010/0125487 A1* | 5/2010 | Sinclair et al. .................. 705/10 |
| 2010/0156900 A1* | 6/2010 | Beckman et al. ............. 345/420 |
| 2010/0205108 A1* | 8/2010 | Mun ........................... 705/36 R |

OTHER PUBLICATIONS

Feasible Reliability Engineering Tool, FReET, last updated Mar. 2, 2009, www.freet.cz.
Prediction Probe, UNIPASS, http://www.unipass.com/predictionprobe/demo2.htm.
A. Touzik, et al., General-purpose distributed software for Monte Carlo simulations in materials design, Science Direct, Computational Materials Science, 2003, http://www.sciencedirect.com/science?_ob=ArticleURL&_udi=B6TWM-49H73N8-8&_user=6692358&_rdoc=1&_fmt=&_orig=search&_sort=d&view=c&_acct=C000070393&_version=1&_urlVersion=0&_userid=6692358&md5=56148c847ffe88714762b4eece10c61c.

* cited by examiner

Primary Examiner — Amy Ng
Assistant Examiner — Andres E Gutierrez
(74) Attorney, Agent, or Firm — Scully, Scott, Murphy & Presser, P.C.; Louis J. Percello, Esq.

(57) ABSTRACT

System, method and graphical user interface for a simulation base calculator provides one or more selectable distribution models. One or more input fields are provided for inputting rules with one or more random variables. A processing module inputs one or more of the selectable distribution models and the rules into a simulator running on the system. An output field is provided for displaying one or more aspects of a result determined by the model run on the simulator.

17 Claims, 5 Drawing Sheets

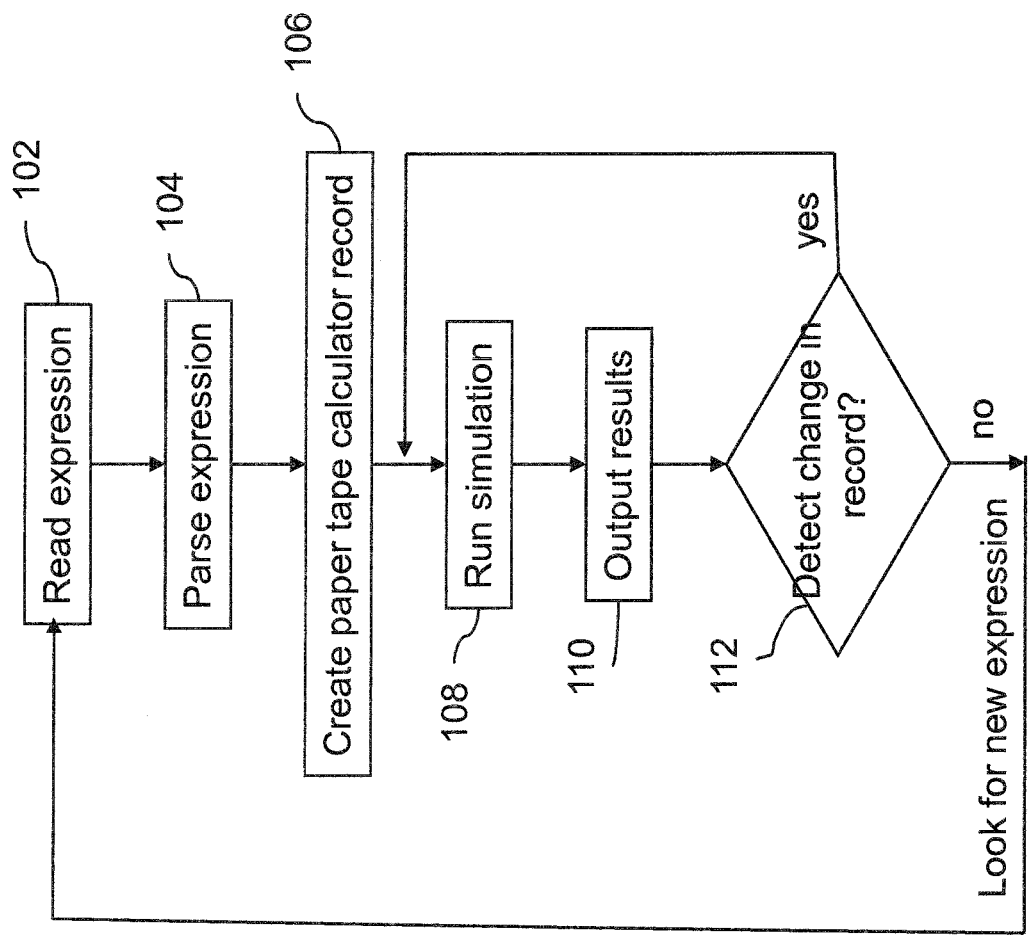

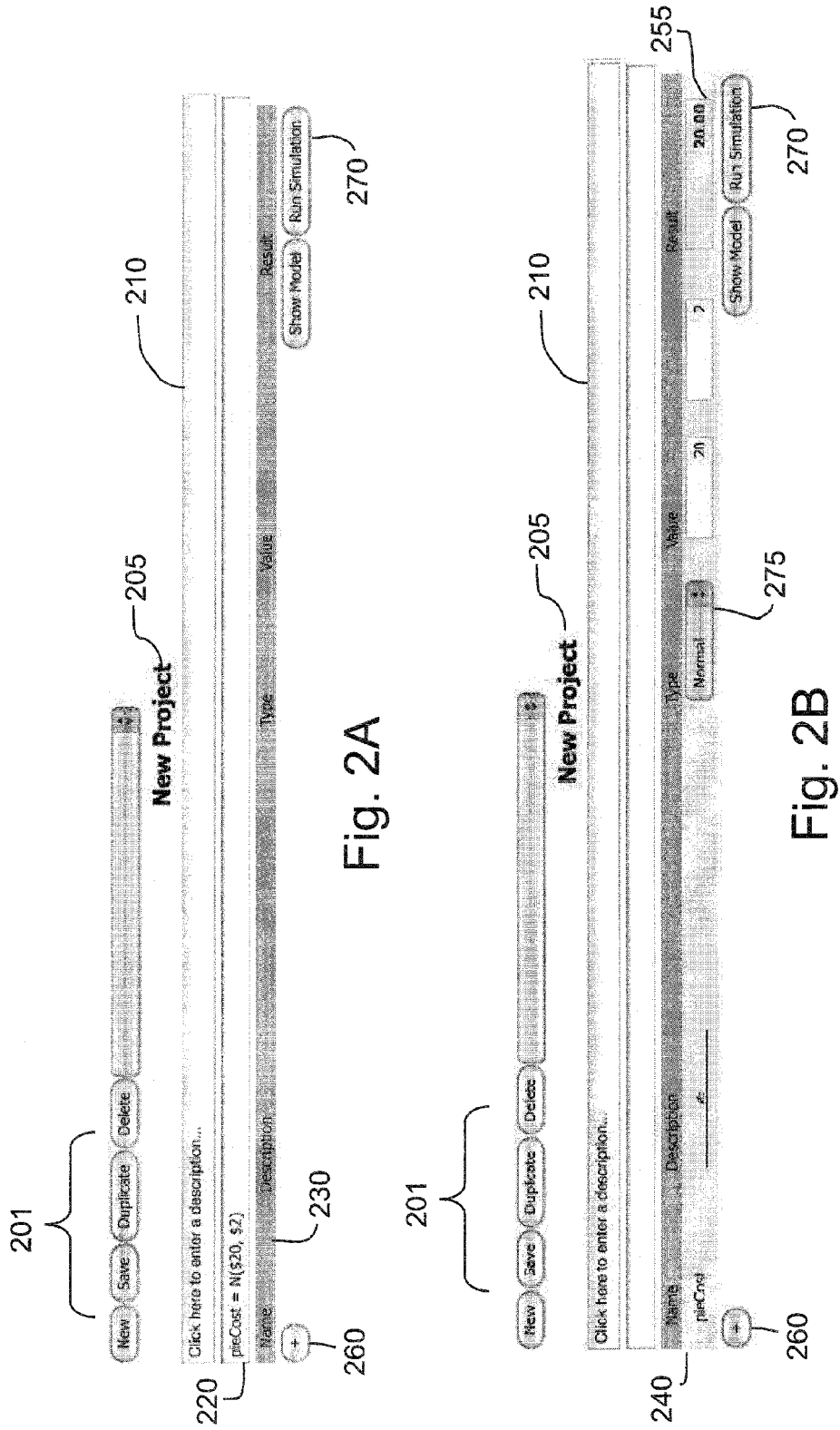

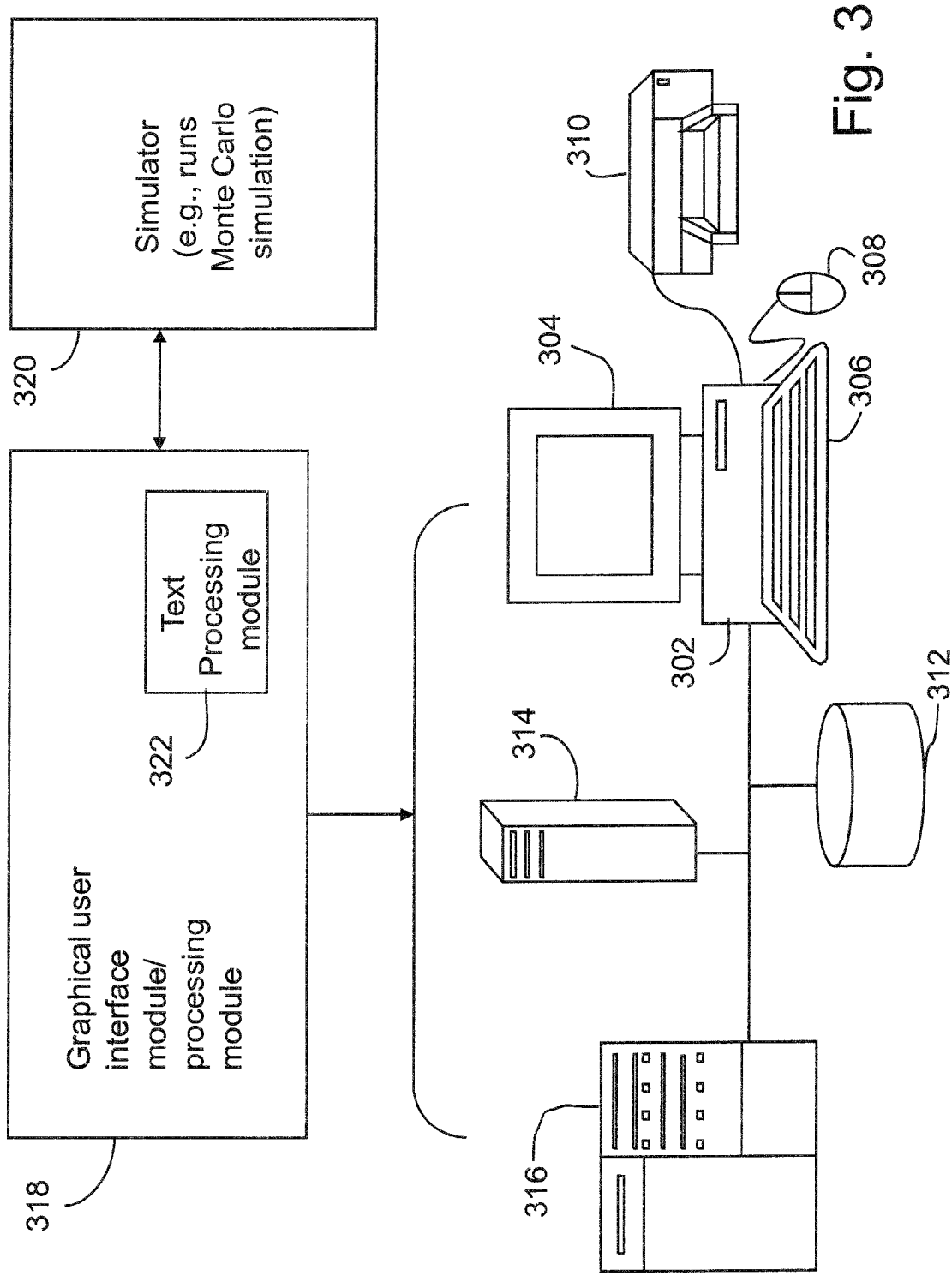

SYSTEM, METHOD AND GRAPHICAL USER INTERFACE FOR A SIMULATION BASED CALCULATOR

FIELD OF THE INVENTION

The present application relates generally to computer systems and computer graphical user interface and more particularly to system, method and graphical user interface for a simulation based calculator.

BACKGROUND OF THE INVENTION

Random variable refers to a variable that does not have a definite value, and has some uncertainty associated with it. Known simulation tools that solve for random variables require the user to have specific knowledge of the tool, specify the particulars of the simulation, then run the simulation to obtain results. Those tools are typically designed for scientist with in-depth knowledge of the various simulations and distribution models used for generating the values for random variables at hand. A user who is unfamiliar with such simulation tools may have difficulty in using them and obtaining the desired results.

BRIEF SUMMARY OF THE INVENTION

A computer graphical user interface system and method for simulation based calculator are provided. The system in one aspect may comprise one or more selectable distribution models and one or more input fields for inputting rules with one or more random variables. A processing module is operable to input the one or more of the selectable distribution models and the rules into a simulator running on the system. An output field is provided for displaying one or more aspects of a result determined by the simulator.

A method for a simulation based calculator, in one aspect, may comprise parsing an expression entered on a computer graphical user interface and determining a distribution model selected on the computer graphical user interface. The method may further include creating a data record including the data from the parsed expression and determined distribution model and executing a computer simulator using the created record. The method may also include displaying one or more results of the computer simulator on the computer graphical user interface.

A program storage device readable by a machine, tangibly embodying a program of instructions executable by the machine to perform methods of a simulation based calculator described herein may be also provided.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a flow diagram illustrating a method of the present disclosure in one embodiment.

FIGS. 2A-2D show screen shots of a user interface of the present disclosure in one embodiment that illustrate examples of graphical user interface components for simulation based calculator in one embodiment.

FIG. 3 illustrates one embodiment of a simulation based calculator system of the present disclosure.

DETAILED DESCRIPTION

Figure 2C:
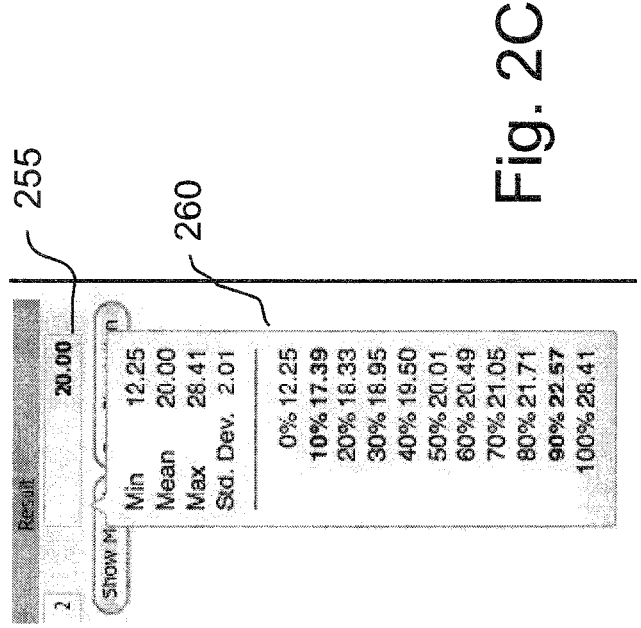

A system, method and graphical user interface for a simulation based calculator are provided that allow the user to specify parameters about the inputs and present the user with a choice of modeling options. Such system, method and graphical user interface may be useful, for example, for those with limited knowledge of the field to be able to use simulation models and to determine results. For example, a user is enabled to run simulations and obtain results, based on simple inputs like "low value", "expected value" and "high value", without a deep understanding of probability distributions. In addition, with the system, method and graphical user interface for a simulation based calculator of the present disclosure in one embodiment, the user does not have to specify everything about the inputs up front for creating and running a simulation model that may include multiple parts; rather, the user is enabled to "play around" inside the simulator or try out different values or variables, and may be provided with a simple choice of alternatives. As such the simulation machine is not a black box to the user anymore.

The system, method and graphical user interface for a simulation based calculator of the present disclosure in one embodiment allow arithmetical computations such as the operations of addition, subtraction, multiplication, division on random variables. Further, the system, method and graphical user interface of the present disclosure in one embodiment allow the user to define formulas including random variables, and obtain results. Additionally, the system, method and graphical user interface of the present disclosure in one embodiment afford interactions for constantly updating the model rather than requiring the classic and explicit workflow loop of define model, run model, refine model.

FIG. 1 is a flow diagram illustrating a method of the present disclosure in one embodiment. A user is provided with a user interface, including an input field for allowing the user to enter input. Examples of the user interface and its components are illustrated in FIGS. 2A to 2D. At 102, input from the user is received and read. The user, for example, enters or inputs an expression into the user interface. The system and/or methodology of the present disclosure uses the input to create or generate a model, and create a record in calculator paper tape (e.g., 240 in FIG. 2B) of the graphical user interface. In the example shown in FIG. 2A, the user may enter or input a new line in the calculator paper tape 240 (e.g., 240 in FIG. 2B) by typing an expression in the command line area 220 and pressing enter key or the like. The types of expression that the user enters may include fixed constant, probability density functions such as normal or Gaussian distribution and triangular distribution, and formula expression, and may have the following format:

variableName=constant e.g., slicesPerPie=8 variableName=formula e.g., totalCost=costPerPie*numPies variableName=$N$(mean,standardDeviation)

e.g., costPerPie=$N$($20,$2)

variableName=$T$(low,expected,high)

e.g. expectedNumberOfKids=$T$(15,20,30)

Expression for normal distribution may be entered with expression "N" followed by a mean and a standard deviation values. A formula may be entered using arithmetic operations and defined variables, random variables, and/or constants. Expression for triangular distribution may be entered with expression "T" followed by minimum, expected, and maximum values. The different types of expressions that can be entered are also referred to herein as rules. The rules may include logic, equation, or other rules, in addition to the above examples. The system and/or methodology of the present disclosure in one embodiment may then parse the expression entered by the user at 104 and create a record in the calculator paper tape (e.g., FIG. 2B, 240) at 106 to represent the expression entered by the user. The created records may be stored in a memory device.

The system and/or methodology of the present disclosure also may enable the user to add a record to the calculator paper tape by providing a graphical user interface icon such as a button or the like which the user may click to add a record. FIG. 2A shows an example of such button 260 at the bottom of the calculator tape.

After the user has entered at least one record to the calculator paper tape, the user may modify that record by changing the variable name, entering a description, changing the type of the expression (e.g., Fixed constant, Normal distribution, Triangular distribution or Formula), or changing the values entered as parameters to the expression type (mean, standard deviation, low, expected, high or formula). The record or data stored in the memory device is then updated with the change.

Referring to FIG. 1, the system and/or methodology of the present disclosure in one embodiment may automatically run a simulation on the inputs at 108 after at least one record has been added to the calculator paper tape. An example of a simulation may include the Monte Carlo method, which performs repeated random number samplings to compute the results. For instance, a random number generator may be used to generate a repeated number of samplings bounded by the distribution parameters provided in the input. Monte Carlo method describes a large and widely used class of approaches to simulation using random occurrences rather than a single method.

At 110, the simulation result is output, for instance, displayed for each record in the calculator paper tape. The system and/or methodology of the present disclosure in one embodiment may automatically re-run the simulation each time a new record is added or a parameter of an existing record is changed. At 112, it is determined whether an existing record value has changed. If an existing record has changed, the simulation is re-run at 108 with the new input value or values. The output of the Monte Carlo simulation is displayed for each record in the calculator paper tape, e.g., in the "Result" column of the graphical user interface display. Additional details of the output such as the mean, minimum, maximum, standard deviation and deciles can be viewed by the user, for example, by "hovering" the mouse (or like input device) over an existing output value. The processing continues to detect more expressions entered, for example, on a command line, at 102. It should be understood that the steps shown in FIG. 1 need not occur sequentially in the order described. Rather some of the steps may occur concurrently or out of order. For instance, detecting changes in existing records may occur concurrently or even after detecting and reading another expression that is entered for creating a new calculator paper tape.

An example session and the associated processing of the graphical calculator of the present disclosure are now described with reference to FIGS. 2A-2D in one embodiment.

In this example scenario, a user is throwing a birthday party for a child and has invited all of the children from the child's class. There are 30 children in the class and the user knows that not all of the children may come to the party. The user plans to order pizza for the party. The user knows that some of the children love pizza and others may not have any at all. Using the calculator of the present disclosure, the user may determine how many children may come to the party, how many pizzas should be ordered, and other variables involved with giving the party.

Shown in FIG. 2A, a graphical user interface for the calculator is presented to the user on the display device. The user interface display including input fields and displays may be implemented using user interface tools and programs, for example, including but not limited to Visual Basic™ programming tools.

Referring to FIG. 2A, the user starts with a blank calculator paper tape. For example, no calculator paper tapes appear initially below the header row 230. The user types expressions in the command line area 220 of the calculator. For the pizza example scenario above, the user may enter "pieCost=N($20, $2)" shown at 220. The user presses enter or the like. The system of the present disclosure receives and reads the input data and parses the expression entered by the user. If the expression is valid, the system generates a record of the expression in the paper tape 240 shown in FIG. 2B. If the expression is invalid, an error message may be displayed and the user is given the opportunity to correct the error. The system runs, for example, the Monte Carlo simulation using the data from the generated record and displays the results in the "Result" column 255 on the graphical user interface display.

Another way for the user to enter a record in the paper tape 240 is to click on the "+" button or like, and enter the values indicated in the columns of the header row 230, e.g., "name" "description", "type" and "value". Name field refers to the name of the random variable being computed. Description field refers to the description of the random variable. Type field refers to the type of the entered expression and may include type of distribution that may be used to compute the values for the random variables. The graphical user interface of the present disclosure may present a selectable list or menu 275 of types, e.g., normal distribution, triangular distribution, user defined formula or other types, from which the user may select. Value field refers to the values associated with the entered expression. The values may depend on the "type" selected. For instance, if the type selected normal distribution, the values column may include the mean and standard deviation values. If the type selected is triangular distribution, the values may include minimum, expected, and maximum values. If the type selected is formula, the value may include the formula definition.

If the user hovers over the result field, additional details of the results may be displayed as shown in FIG. 2C. Since "pieCost" is a random variable with a normal distribution, the value of the variable changes during the simulation. The "Result" field 255 displays the mean value after the simulation runs; the details 260 show the distribution of those values during the course of the simulation.

Figure 2D:
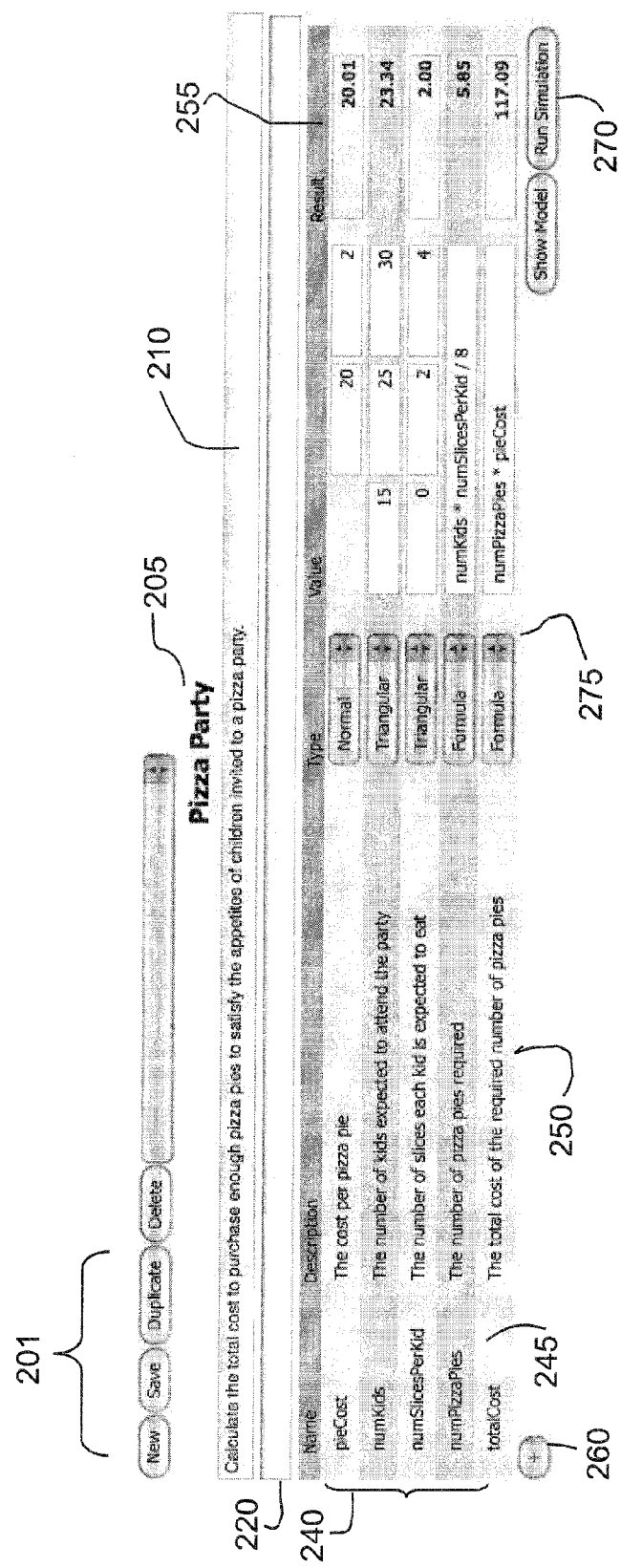

The user may enter another expression in the command line area 220 as described above or press "+" button 260 or like to perform the operations on the calculator. Continuing with the example scenario, the next entry may be a triangular distribution of the number of children expected to come to the party. Thirty children have been invited to the party. The number of children expected to attend is 20, with a low of 15 and a high of 30. For such a model, the user may enter, "numKids=T(15, 20, 30)" on the command line area 220. The user presses "enter" or like key and the system parses the expression entered by the user. A record of the expression is added to the paper tape as shown in the second row of the paper tape at 240 (FIG. 2D). The record is also stored on a memory device for immediate and/or later use. Once the record has been added to the paper tape, the system again runs the simulation automatically, e.g., Monte Carlo simulation, using the data associated with the created record, and displays the results in the "Result" column 255. The Monte Carlo simulation is run this time to model triangular distribution as indicated in the created record.

The user may add another expression to model how many slices of pizza each child will likely eat at the party. For instance, the user may enter an expression that models a triangular distribution with a low of zero slices, for those children who do not eat pizza, an expected of two slices and a high of four slices. Thus, the user may enter "numSlicesPerKid=T(0, 2, 4)".

The user presses enter or the like to signal the end of input, and the system parses the expression entered by the user. A record of the expression is added to the paper tape as shown at 240 (FIG. 2D) in the third row of the paper tape. The record or data associated with the record is also stored on a memory device for immediate and/or later user. Once the record has been added to the paper tape, the system again runs the simulation (e.g., Monte Carlo simulation) and displays the results in the "Result" column 255.

Continuing with the example scenario, to determine or calculate the number of pizza pies needed to satisfy the expected number of children and their appetite for pizza, the user may enter a formula. Each pizza has eight slices, so the number of pizzas required would be represented by the following formula: numPizzaPies=numkids*numSlicesPerKid/8. The user may enter the formula in the command line area 220. The user presses enter key or like to indicate the end of input, and the system parses the expression entered by the user. A record of the expression is added to the paper tape as shown at 240, FIG. 2D. The record is also stored on a memory device for immediate and/or later use. Once the record has been added to the paper tape, the system again runs the simulation (e.g., Monte Carlo simulation) and displays the results in the "Result" column 255. The result displayed indicates the expected number of pizza pies needed to satisfy the appetites of the expected number of children. If the user hovers over that result (e.g., using an input device such as a mouse device), the system displays the distribution of those values, for example, as explained above with reference to FIG. 2C. The distribution of those values, for instance, may show the minimum number of pizza pies that would be required, the mean number of pizza pies, the maximum number of pizza pies, and different percentile in the distribution. Using the resulting values, the user is able to make an informed decision about the number of pies to order with some comfort that the children will have enough to eat and that the user will not have too many pies left over.

Continuing with the example scenario, the user may also calculate the cost of the pizza pies required for the party, for instance, by entering "totalCost=numPizzaPies*pieCost" in the command line area 220. The user presses enter (or like key to signal the end of input) and the system reads and parses the expression entered by the user. A record of the expression is added to the paper tape, for example, shown in FIG. 2D at fifth row of 240. Once the record has been added to the paper tape below, the system again runs the simulation (Monte Carlo simulation) and displays the results in the "Result" column 255. Distribution details for that cost may be displayed for this particular simulation run by hovering over the result data using an input device such as a mouse device, for example, as explained above with reference to FIG. 2C.

In one embodiment, the elements of the calculator model are all editable. The project can be given a title by clicking on the "New Project" header 205 on the graphical user interface and typing a new title. Likewise, the user can enter a description by clicking "Click here to enter a description . . . " 210. The user can click on any of the elements in the calculator paper tape 240 to change the values and re-run the simulation. In the example screen shot shown in FIG. 2D, the user has entered a description of each of the variables and has changed the expected number of children from 20 to 25 (second row of paper tape, second value in the value column). The user could also change the expected number of children from a triangular distribution to a normal distribution with a mean of 20 children and a standard deviation of 2 children.

If the user enters a formula that results in an error, such as referencing a variable that does not exist or entering parameters to a distribution that are not supported (e.g. low value is greater than expected value), the system and/or methodology of the present disclosure displays an error indicator. The error may be displayed in detail by moving the mouse or like input device over the error indicator.

As described above, the user may enter the input via the command line 220, or by pressing the "+" button 260 which displays an empty paper tape into which the user may enter the data. Model management buttons (Save, Duplicate, Delete, pulldown Saved models from a list of arbitrary length) or like shown at 201 may be used to manage the created paper tape records or models. For instance, the user may save, duplicate, delete, pulldown saved models from a list. Model name user input field 205 allows the user to name the model. The example of FIG. 2D shows the model named as "Pizza Party". The model description user input field 210 enables the user to enter the description for the model. The system and/or methodology of the present disclosure saves or stores the description input with the model records. As described above, the user input field 220 is used for inputting variable names, types, values, formulas, e.g. "kids=T(15, 20, 30)<return>". After receiving the input and validating it, the system and/or methodology of the present disclosure generate a row where Name=kids, Description=null, Type=Triangular, Value=[15, 20, 30], i.e., creates a paper tape record. The header row 230 shows the column headers (e.g., Name, Description, Type, Value, Result) of the calculator paper tape. The collection of rows 240 show the "paper tape" view of the model. Each paper tape, or collection of rows, constitutes a model which can be stored or retrieved independently and upon which the simulation can be run.

The items in the Name column 245 may be edited by the user even after they are defined in the input field 220. The system and/or methodology of the present disclosure may automatically propagate name changes through the model and update the data in the paper tape 240. For example, if the user were to edit the text "kids" in the Name column to "hungry_kids", that new name would automatically propagate through the model such that the Formula in the fourth row of paper tape 240 would be updated in the Value column to be "hungry_kids*numSlicesPerKid/8".

Items in the Description column 250 are user inputs. Those fields may be generated as blank <null> once the user inputs an expression in 220. For example, in the input field 220, user may type "x=30<return>" and this action triggers the system and/or methodology of the present disclosure to add new row of the paper tape 240 where Name=x and Value=30. In this example, since the user did not input any description, the Description field would be generated as <null> or blank value.

The "Result" column 255 is used to display the system generated results. The "Result" column 255 includes a roll-over capability that when an input device is detected as being hovering in the "result" column 255 area, additional data is shown (e.g., FIG. 2C). Up/down arrows may be provided on rollover, e.g., at the far right of each row, to allow the user to move rows up or down in the paper tape. The "+" button 265 or like functionality adds a row to the paper tape 240. "Run Simulation" button 270 or like when pressed or otherwise selected, forces a re-run of the simulation. Note that the system and/or methodology of the present disclosure may run the simulation automatically, without the user having to select this button, each time a user inputs or edits a value. For example, if the user were to input a value for one of the existing variables, "x=20<return>" in the input field 220, the model would update visually in paper tape 240 and the simulation would re-run automatically.

Help hover text may be provided in the graphical user interface of the present disclosure in one embodiment. For instance, hovering the input device such as the mouse device over the fields in the graphical user interface displays help messages associated with that field or data entered in the field. For instance, explanation of expected usage and/or error messages may be displayed.

While the above description used "pizza party" scenario as an example, the system, method and graphical user interface of the present disclosure may be applied to solve for many different solutions, for example, including but not limited to the fields of business, financial problems, government, education, inventory planning, resource management, resource planning, and others.

FIG. 3 illustrates one embodiment of a simulation based calculator system of the present disclosure and computer system which may carry out the methodology of the present disclosure in one embodiment. Examples of functional components or modules of the simulation based calculator system in one embodiment are shown. The functional components illustrate logical functions of the simulation based calculator system in one embodiment and may be implemented as one or many separate modules. The system may include a graphical interface module 318 that handles displaying of the graphical user interface screen including the input and output fields as described above, and receiving user input data or expression. The graphical interface module 318 or like functionality may perform some or all algorithms described with reference to FIG. 1. The graphical interface module 318 or like functionality may further include an input processing or text processing module 322 or like functionality that may parse the input expression, process and determine the type of data entered, and create a record of the entered data. The created record is also stored on a memory device and associated with the current paper tape or model already stored on the memory device if any. The parsed data may be input into a simulator module 320 or like functionality to run the simulation. The simulation may be run for all the records associated with the current paper tape (or model) or one or more of the records associated with the current paper tape. The simulator module 320 may perform statistical model simulation or Monte Carlo simulation. There may be other simulation methods that apply. The simulation module 320 may be a replaceable component and may be replaced with different simulation approaches. The simulator module 320 may utilize any known or will be known simulation programs or like that perform such simulation. The graphical interface module 318 receives and displays the output from the simulator 320. The graphical interface module 318, text processing module 322 and simulator module 320 may run on a single platform (e.g., 302), or on multiple platforms (e.g., two or more of 302, 314 and 316) in a distributed environment.

System, method and graphical user interface for simulation based calculator of the present disclosure enable users to perform arithmetic operations on random variables. An entire simulation model comprising non-deterministic variables (or random variables) may be built incrementally by inputting only a minimum number of parameters at a time.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 3, the systems and methodologies of the present disclosure may be carried out or executed in a computer system that includes a processing unit 302, which houses one or more processors and/or cores, memory and other systems components (not shown expressly in the drawing) that implement a computer processing system, or computer that may execute a computer program product. The computer program product may comprise media, for example a hard disk, a compact storage medium such as a compact disc, or other storage devices, which may be read by the processing unit 302 by any techniques known or will be known to the skilled artisan for providing the computer program product to the processing system for execution.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The computer processing system that carries out the system and method of the present disclosure may also include a display device such as a monitor or display screen 304 for presenting output displays and providing a display through which the user may input data and interact with the processing system, for instance, in cooperation with input devices such as the keyboard 306 and mouse device 308 or pointing device. The computer processing system may be also connected or coupled to one or more peripheral devices such as the printer 310, scanner (not shown), speaker, and any other devices, directly or via remote connections. The computer processing system may be connected or coupled to one or more other processing systems such as a server 310, other remote computer processing system 314, network storage devices 312, via any one or more of a local Ethernet, WAN connection, Internet, etc. or via any other networking methodologies that connect different computing systems and allow them to communicate with one another. The various functionalities and modules of the systems and methods of the present disclosure may be implemented or carried out distributedly on different processing systems (e.g., 302, 314, 316), or on any single platform, for instance, accessing data stored locally or distributedly on the network.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer graphical user interface system comprising:
   one or more selectable distribution models;
   one or more user input fields for inputting rules associated with one or more random variables, said rules for computing said one or more random variables;
   a processor for inputting one or more of the selectable distribution models and the rules into a simulator running on the system; and
   an output field displaying one or more aspects of a result determined by the simulator, wherein said computer graphical user interface system enables a user to compute said one or more random variables and use said one or more random variables to compute another one or more random variables having a defined formula entered via the graphical user interface system, the defined formula including the one or more random variables for computing said another one or more random variables, wherein the processor automatically reruns the simulator to recomputed said result of said another one or more random variables if one or more values of said one or more random variables are changed, and wherein operations including at least addition, subtraction, multiplication, and division on said one or more random variables are enabled via the computer graphical user interface system,
   wherein the processor is further operable to accumulate the one or more of the selectable distribution models and the rules as entered in the computer graphical user interface system and automatically re-run the simulator as the one or more of the selectable distribution models and the rules are entered, wherein the accumulated selectable distribution models and the rules collectively form a project model that can be stored and retrieved and upon which a simulator can be run.

2. The system of claim 1, wherein the one or more selectable distribution models include one or more probability density functions.

3. The system of claim 2, wherein the one or more probability density functions include Gaussian distribution, triangular distribution, or normal distribution or combinations thereof.

4. The system of claim 1, wherein the one or more selectable distribution models has one or more attributes that are inputted into the one or more input fields.

5. The system of claim 1, wherein the simulator runs a statistical model or a Monte Carlo model, or combinations thereof.

6. The system of claim 1, wherein the system is applied to one or more fields of finance, education, government, inventory planning, resource management, resource planning.

7. The system of claim 1, wherein the processor is further operable to detect a change in one or more values of the one or more input fields and automatically rerun the simulator with the changed values.

8. A method for simulation based calculator, comprising:
   parsing an expression entered on a computer graphical user interface, said expression including one or more rules for computing one or more random variables;
   determining a distribution model selected on the computer graphical user interface;
   creating a data record including the data from the parsed expression and determined distribution model;
   executing a computer simulator using the created record;
   displaying one or more results of the computer simulator on the computer graphical user interface,
   wherein said simulation based calculator enables a user to compute said one or more random variables and use said one or more random variables to compute another one or more random variables having a defined formula entered via the graphical user interface system, the defined formula including the one or more random variables for computing said another one or more random variables, wherein the simulation based calculator automatically reruns the simulator to re-compute said results of said another one or more random variables if one or more values of said one or more random variables are changed, and wherein operations including at least addition, subtraction, multiplication, and division on said one or more random variables are enabled via the computer graphical user interface system,
   wherein the method further comprises accumulating the one or more of the selectable distribution models and the rules as entered in the computer graphical user interface and automatically re-running the simulator as the one or more of the selectable distribution models and the rules are entered, wherein the accumulated selectable distribution models and the rules collectively form a project model that can be stored and retrieved and upon which a simulation can be run.

9. The method of claim 8, further including:
   determining a change in the data record displayed on the computer graphical user interface; and
   re-executing the computer simulator with the changed data record as input to the computer simulator.

10. The method of claim 9, wherein the change in the data record is detected from the computer graphical user interface in response to a user entering a different value for the data record.

11. The method of claim 8, wherein the steps of claim 8, are repeated for each expression entered.

12. The method of claim 11, wherein the computer simulator is automatically re-executed for all expressions entered in response to an additional expression being entered.

13. The method of claim 8, wherein the computer simulator runs a statistical model or a Monte Carlo model, or combinations thereof.

14. A non-transitory computer-readable medium readable by a machine, tangibly embodying a program of instructions executable by the machine to perform a method of a simulation based calculator, comprising:
   parsing an expression entered on a computer graphical user interface, said expression including one or more rules for computing one or more random variables;
   determining a distribution model selected on the computer graphical user interface;
   creating a data record including the data from the parsed expression and the determined distribution model;
   executing a computer simulator using the created record; and
   displaying one or more results of the computer simulator on the computer graphical user interface, wherein said simulation based calculator enables a user to compute said one or more random variables and use said one or more random variables to compute another one or more random variables having a defined formula entered via the graphical user interface system, the defined formula including the one or more random variables for computing said another one or more random variables, wherein the simulation based calculator automatically reruns the simulator to recomputed said results of said another one or more random variables if one or more values of said one or more random variables are changed, and wherein operations including at least addition, subtraction, multiplication, and division on said one or more random variables are enabled via the computer graphical user interface system, wherein the method further comprises accumulating the one or more of the selectable distribution models and the rules as entered in the computer graphical user interface and automatically re-running the simulator as the one or more of the selectable distribution models and the rules are entered, wherein the accumulated selectable distribution models and the rules collectively form a project model that can be stored and retrieved and upon which a simulation can be run.

15. The program storage device of claim 14, further including:
   determining a change in the data record displayed on the computer graphical user interface; and
   re-executing the computer simulator with the changed data record as input to the computer simulator.

16. The program storage device of claim 15, wherein the change in the data record is detected from the computer graphical user interface in response to a user entering a different value for the data record.

17. The program storage device of claim 14, wherein the computer simulator runs a statistical model or a Monte Carlo model, or combinations thereof.

* * * * *